United States Patent
Thorniley

[11] 4,031,358
[45] June 21, 1977

[54] OPTICAL CODE READERS

[75] Inventor: Brian Robert Thorniley, Wimborne Minster, England

[73] Assignee: Plessey Handel und Investments A.G., Zug, Switzerland

[22] Filed: July 1, 1975

[21] Appl. No.: 592,264

[30] Foreign Application Priority Data
July 3, 1974  United Kingdom ............. 29423/74

[52] U.S. Cl. ......................................... 235/61.11 E
[51] Int. Cl.² ..................... G01N 21/30; G06K 7/10
[58] Field of Search ......... 235/61.11 E; 250/219 D, 250/219 Q; 360/117

[56] References Cited
UNITED STATES PATENTS

| 3,700,858 | 10/1972 | Murthy | 235/61.11 E |
| 3,727,030 | 4/1973 | McMurtry | 235/61.11 E |
| 3,748,483 | 7/1973 | Englund et al. | 235/61.11 E |
| 3,761,685 | 9/1973 | Alpert | 235/61.11 E |
| 3,784,794 | 1/1974 | Allais | 235/61.11 E |
| 3,868,514 | 2/1975 | Israelsson | 235/61.11 E |
| 3,869,599 | 3/1975 | Sansone | 235/61.11 E |
| 3,892,974 | 7/1975 | Elletson et al. | 235/61.11 E |

*Primary Examiner*—Vincent P. Canney
*Attorney, Agent, or Firm*—Fleit & Jacobson

[57] ABSTRACT

A probe for scanning optically encoded data in the form of elongate bars comprises a resiliently mounted tip which in use is scanned across the data to be read and which is retractable under pressure into the body of the pen.

3 Claims, 3 Drawing Figures

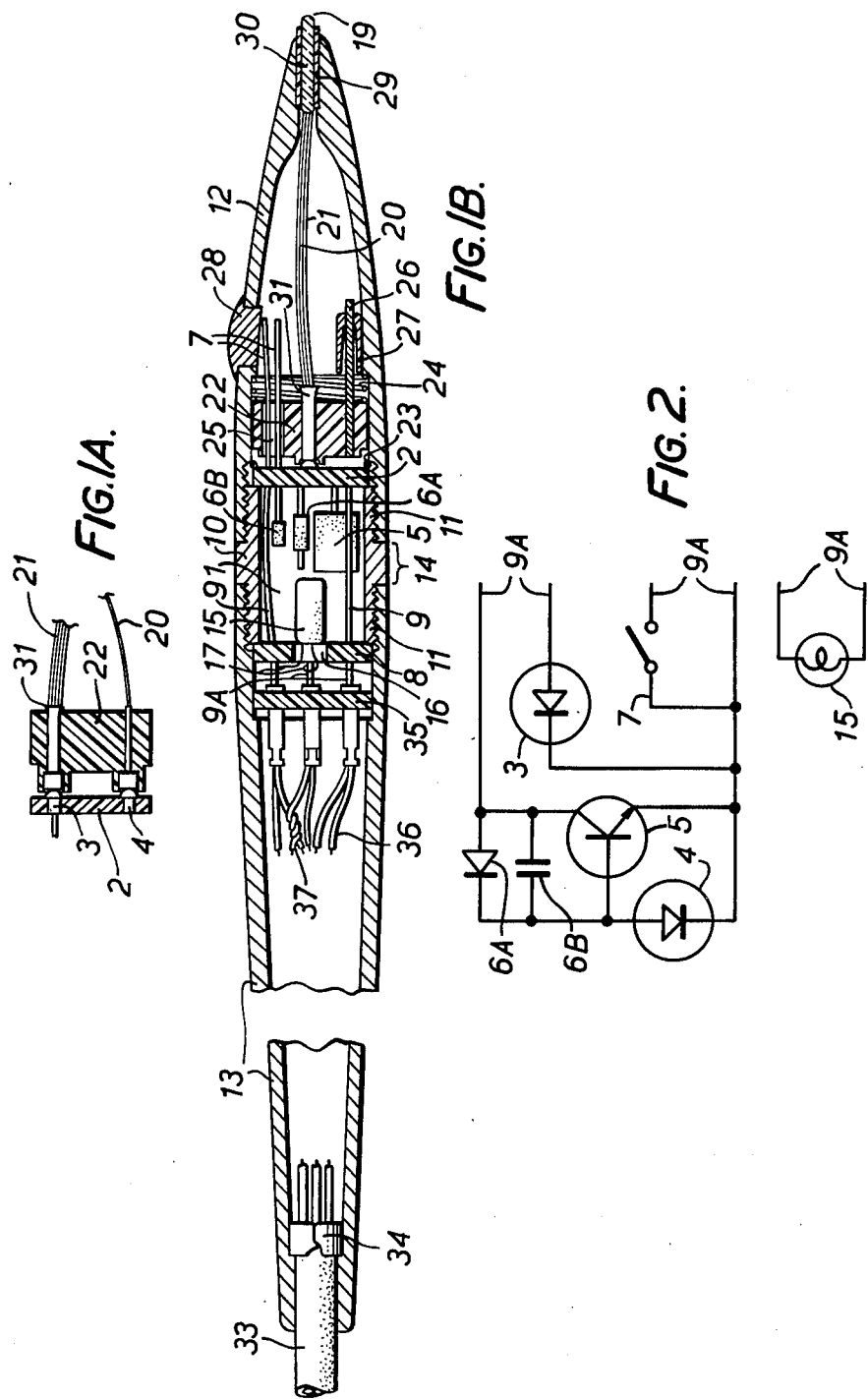

OPTICAL CODE READERS

This invention relates to optical code readers.

A number of methods are known to those skilled in the art, whereby digital data appertaining to the identity of objects or of individual people can be representated in the form of a Bar-Code printed on a package, a form, or a label which can be attached to a package.

Such codes are becoming widely used in such establishments as Libraries for the identification of books and borrowers, in hospitals for the identification of patients, drugs and records, in retail shops and wholesale depots for stock control, and in supermarkets and department stores for Point of Sale Data Capture.

Several types of code are in use, most of which are arranged as a series of parallel lines up to 1 inch long extending over a lateral distance of up to 4 inches. The best known of these codes is the Universal Produce Code adopted by the U.S. Uniform Grocery Produce Code Council, in which each numerical character of a 10 digit code is represented by a combination of 2 dark and 2 light bands of various relative widths depending on the digit represented.

Other codes represent the decimal digits in binary coded decimal form, in which binary zeroes are represented by one sub-pattern and binary ones are represented by another.

Such codes and methods of reading decoding them are well known, and described in prior patents and other publications. In particular, a code and decoding method used by the applicant have been described in U.S. Pat. No. 3,783,245.

The essential link between the printed code and the decoding electronics is the device used to scan the label and convert its pattern of dark and light bars into electrical signals which can be decoded electronically.

One common group of devices used for this purpose utilise laser beams scanned across the label and photomultiplier cells to detect the resulting changes in reflected light level as the laser beam passes across the dark and light parts of the code pattern.

Another group of devices are described as light pens, probes or wands, and these are held in the hand. They superficially resemble a ball-point pen with a flexible cable emerging from its upper end. In some designs this cable may comprise electrical wires exclusively, in other arrangements the signal may be conveyed along the cable through an optical fibre.

At the tip of the pen which passes across the code, some designs employ a small lens system to focus a spot of light on the part of the code immediately underneath the tip, and to produce an image of the code element on a photodiode or photo-transistor which converts the variations in light detected as the tip passes across the pattern, into electrical signals.

A preferred design uses short lengths of optical fibre extending from the tip of the pen to a light source and a light detector respectively, so arranged that the only light reaching the detector is that reflected into the relevant optical fibre at the tip of the pen. In order to make the device substantially independent of ambient light conditions, the source of illumination in the pen, and the photodetector, are arranged to operate in the infra-red part of the spectrum.

It has been found in practice that if the optical fibres employed are glass, the pen tends to be somewhat fragile, and if dropped on its tip the fibres will easily chip or shatter with obvious impairment of their performance.

On the other hand, when plastic fibres are used, the abrasive effect of the paper on which the codes are printed gradually wears the plastic during the life of the pen until its light transmission is seriously impaired. Experience shows that, whereas a very light pressure on the paper is all that is required, most users accustomed to using a ball-point pen with a moderately high pressure exert a similar pressure on the light pen, which greatly accelerates the rate of wear.

According to one aspect of the present invention a probe for scanning optically encoded data comprises a resiliently mounted tip which in use is scanned across data to be read.

The tip may be biased normally to project from a tubular end part of the probe.

The tip may be biased by means of the natural springiness of light transmission fibres optically coupled to the tip. The fibres may form a part of the tip.

According to another feature of the invention a probe for scanning optically encoded data is of modular construction.

One design of light pen described below has provision for ensuring that the pressure on the tip of the plastic light fibres cannot exceed about 16 gms (1 oz), however heavily the user presses the pen onto the paper. Moreover, the electronics integral with the pen, and the light fibre section are both modular and can be changed very quickly, the light fibre section being so simple in design that in the unlikely event of excessive wear, it can readily be replaced.

Some exemplary embodiments of the invention will now be described with reference to the accompanying drawings in which:

FIG. 1A is a cross sectional side elevation of part of a probe;

FIG. 1B is a cross sectional side elevation of the probe part of which is shown in FIG. 1A and which has been rotated by 90° about the longitudinal axis with respect to FIG. 1B; and FIG. 2 is a circuit diagram of a module of the probe shown in FIGS. 1A and 1B.

The main circuitry of an electronic module 1 is assembled on a small (⅝ inch dia.) circular, double sided, printed circuit board 2, which locates an l.e.d. light source 3 and a phototransistor 4 in accurately drilled holes with centres ¼ inch apart. The printed circuit board also provides for the connection of gold plated phosphor bronze wires 7 which project forward towards a tip part of the pen to serve as a location wire and to serve also as parts of a finger-tip operated switch.

Other components mounted on this p.c. board are a transistor 5, a diode 6A and a capacitor 6B connected as shown in FIG. 2 to form a pre-amplifying stage for the output of the phototransistor 4.

The electronic module 1 is completed by another single-sided printed circuit board 8 mounted behind the first and partly supported by four phosphor bronze conductors 9 (only two of which are shown) which extend between the boards which, together with two shorter conductors (not shown) project beyond and to the rear of the board 8 about ¼ inch to form projecting pins 9A suitable for mating with a standard integrated circuit socket. Before assembly of the second p.c. board 8, a cylindrical translucent plastic cover 10 is placed between the two p.c. boards to provide a housing for the electronic module. This plastic cover 10 is provided with two threaded sections 11 on to which is screwed two plastics mouldings 12, 13 to form the outer casing and the remainder of the probe housing, and to minimise the risks of inadvertent dismantling of the pen, these threaded sections have left-hand threads. An another insurance against inadvertent or unauthorised dismantling of the assembly, slight indentations may be moulded into the abutting surfaces of mouldings 10, 12 and 13 so that they can only be unscrewed with the additional leverage provided when a special wrench is applied to the central section 10.

Between the two screwed sections of the cover 10, a mid section 14 of the translucent cover 10 remains uncovered, to form a window through which the light of an incandescent indicator lamp 15 can be seen. This is a very small lamp and is inserted through an aperture 16 in the printed circuit board 8 and its wire leads 17 are connected to the pins 9A projecting therefrom. The lamp 15 is the component most likely to fail in normal service, and therefore it is possible to replace it without dismantling the assembly. It is supported by its leads in the centre of the cover 10 well clear of any other components, and even when the probe is dropped it is largely isolated from any mechanical shocks, so maximising its reliability.

This lamp 15 may be used for any one or several functions, such as a "ready" lamp, an error lamp, or to signal acceptance of data, according to a user's requirements. Similarly the finger-tip switch 7 may, for example, be used to initiate the application of power to the circuit, and/or the input of data already read and held in a buffer, or for cancelling an entry.

The moulding 12 of the outer casing serves to support and house a reading tip 19 of the pen, from which optical fibres 20, 21 pass back to a locating assembly 22 which aligns itself against the printed circuit board 2 when the cover 10 and the moulding 12 are screwed together, with the extremities of the optical fibres abutting transparent windows of the light source 3 and the light detector 4.

The locating assembly 22 is urged forward against a retaining clip 23 by a spiral spring 24 located behind it. This ensures that the light source 3 and detector 4 will make intimate contact with the extremities of the optical fibres 20 and 21 without the necessity of tight manufacturing tolerances. As already mentioned, the phosphor bronze wires 7 forming the finger-tip switch also serve as a locating wire in a slot 25 in the locating assembly 22.

The assembly 22 is retained within the moulding 12 of the outer casing by means of a pin 26 and a tapered aperture 27 so that when the moulding 12 is rotated to screw it on to the cover 10, the assembly 22 rotates with the moulding 12. Since the printed circuit board 2 and the assembly 22 are coupled by the wires 7, the main electronic module 1 also rotates with the moulding 12 and within the cover 10 which is loosely fitting.

When the parts 10 and 12 have been screwed together as just described, the tip of the phosphor bronze wires 7 are located just inside resilient rubber plug 28 which can be squeezed with a finger tip to cause the juxtaposed wires 7 to make mutual contact so as to provide the necessary switching action.

One end of the moulding 12 contains a stainless steel ferrule 29 within which a short piece of stainless steel tube 30 about 3/16 inch long is slidably located.

The inner end of this tube is splayed out slightly so that it cannot extend beyond a predetermined short distance (about one thirty-second to one sixty-fourth inch) from the end of the ferrule 29. Within the tube is cemented an assembly of one central optical fibre 20 and surrounding it five larger fibres 21 as described in our U.K. Pat. No. 1,375,963. The total length of the fibres is slightly more than 1.5inches, the inner end of the five larger fibres 21 being secured in another piece of tubing 31 forming part of the locating assembly 22, to register with the light source 3 as described above. Similarly the single thinner fibre 20 is secured opposite the light detector 4. Thus, infra-red light originating at the light emitting diode 3 is conducted down the five optical fibres 21 to the tip of the pen 19, where they illuminate an area of the bar-coded label (not shown) in contact with the tip 19, and the light reflected from part of this illuminated area is detected by the central optical fibre 20 and transmitted back to the phototransistor 4.

The plastic optical fibres are arranged to be slightly longer than the distance between the extreme forward position of the tubing 30 and the locating assembly 22, so that they take up a bowed position, and their tendency to straighten produces a small axial force tending to urge the tubing forward in the ferrule 29. When a slight pressure is applied to the tip of the pen, the force exerted by the plastic fibres is overcome and the tubing 30 retracts until the applied pressure is taken up by the ferrule. The pressure on the tip 19 of the tube, and of the optical fibres (which are flush with it) can never exceed the force exerted by the bowed optical fibres, and this is adjusted to about 16 grm (1 oz.) in order to minimise wear on the tips of the optical fibres. A further advantage of this effectively spring-loaded arrangement of the tip is that if the pen is scanned accross an uneven surface, the tip will follow undulations which would tend to lose contact with the tip of a fixed probe.

A flexible multi-core cable 33 connects the probe to its associated electronic system. This cable enters the third section with a retaining collar 34 preventing it from being pulled out. The last 2 inches of the outer sheating is removed to permit the individual conductors of the cable to twist and untwist within the moulding 13 as it is screwed on to the central section of the cover 10. The five conductors 36 and the screening braid 37 of the signal conductor are terminated on six terminals of an integrated circuit type socket 35 which mates with the six phosphor bronze pins 9A on the main electronic module 1.

Although the present invention is concerned especially with the provision of a biased probe tip and/or probe of modular construction, it is not limited only to these aspects and may comprise any one or more of the features hereinbefore described alone or in combination.

What we claim is:

1. A probe for scanning optically encoded data comprising a generally tubular housing including a light source, a reading head fitting slidably within the tubular housing, a plurality of optical fibres forming a light guide means wherein the optical fibres are positioned and arranged to bias by reason of their natural springiness the said reading head so that its tip is constrained normally to project from the said housing, and an optical detector arranged within the tubular housing, said light source and said optical detector being optically coupled via said optical fibres to said tip of said reading head so that light is transmitted from said light source via said fibres to illuminate data scanned and so that light reflected from data thus illuminated is returned from said tip of said reading head along another of said fibres to be received at said optical detector.

2. A probe as claimed in claim 1 wherein the tubular housing is formed in at least two parts which are adapted to screw together and which enclose therein a module carrying electronic circuitry for processing data scanned by the probe.

3. A probe as claimed in claim 2 wherein the tubular housing includes a switch button which projects through the wall of the housing to co-operate with switch means within the housing whereby depression of the button externally of the housing actuates the switch means.

* * * * *